(12) United States Patent  
Holmes et al.

(10) Patent No.: US 8,906,221 B2
(45) Date of Patent: Dec. 9, 2014

(54) ELECTROCHEMICAL GRINDING TOOL AND METHOD

(75) Inventors: James Bradford Holmes, Fountain Inn, SC (US); Andrew Lee Trimmer, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 13/567,201

(22) Filed: Aug. 6, 2012

(65) Prior Publication Data

US 2014/0034512 A1  Feb. 6, 2014

(51) Int. Cl.
*B23P 6/04* (2006.01)
*B23H 5/08* (2006.01)
*B23H 9/10* (2006.01)

(52) U.S. Cl.
CPC . *B23P 6/045* (2013.01); *B23H 5/08* (2013.01); *B23H 9/10* (2013.01)
USPC ......................................................... 205/662

(58) Field of Classification Search
CPC .............. B23H 9/02; B23H 9/10; B23H 5/08; B23P 6/002–6/007; B23P 6/045
USPC ................................................. 205/662–663
See application file for complete search history.

(56) References Cited

U.S. PATENT DOCUMENTS

| 3,309,294 A | 3/1967 | Goodwin |
| 3,459,645 A | 8/1969 | Wilson et al. |
| 3,515,659 A | 6/1970 | Broat et al. |
| 3,551,310 A * | 12/1970 | Inoue ........................... 205/670 |
| 3,970,538 A | 7/1976 | Lucas |
| 4,052,284 A | 10/1977 | Schrader |
| 4,159,407 A | 6/1979 | Wilkinson et al. |
| 4,170,528 A * | 10/1979 | Mathews ...................... 205/644 |
| 4,217,190 A | 8/1980 | Neal et al. |
| 4,657,649 A | 4/1987 | Hinman |
| 4,663,011 A | 5/1987 | Hinman |
| 4,686,020 A | 8/1987 | Hinman |
| 4,756,812 A | 7/1988 | Hinman |
| 4,772,372 A | 9/1988 | Bruns et al. |
| 4,851,090 A | 7/1989 | Burns et al. |
| 4,888,863 A | 12/1989 | Cox et al. |

(Continued)

FOREIGN PATENT DOCUMENTS

JP           7204935       8/1995
WO     WO 2006/137889    12/2006

*Primary Examiner* — James Lin
*Assistant Examiner* — Ho-Sung Chung
(74) *Attorney, Agent, or Firm* — Ernest G. Cusick; Gary M. Hartman; Domenica N. S. Hartman

(57) ABSTRACT

An electrochemical grinding tool and method capable of rounding sharp edges that may be prone to cracking, for example, edge regions of cooling slots within dovetail slots of turbine wheels. The electrochemical grinding tool includes a drilling assembly, a conductive bit, and a motor for rotating the conductive bit about an axis thereof. The conductive bit of the electrochemical grinding tool is inserted into a first slot, an electrolyte solution is applied between the conductive bit of the electrochemical grinding tool and a second slot that intersects the first slot, an electrical potential is applied to the conductive bit and the turbine wheel to create a potential gradient between the conductive bit and the edge of the second slot, and material is removed from the edge of the second slot by displacing the conductive bit about and along the edge.

9 Claims, 9 Drawing Sheets

(56) References Cited

U.S. PATENT DOCUMENTS

| | | |
|---|---|---|
| 4,999,093 A | 3/1991 | Moracz |
| 5,149,073 A | 9/1992 | Fraser |
| 5,188,514 A | 2/1993 | Inserva et al. |
| 5,197,191 A * | 3/1993 | Dunkman et al. ........... 29/889.1 |
| 5,235,745 A | 8/1993 | Fraser |
| 5,662,783 A | 9/1997 | Cannon et al. |
| 6,234,752 B1 | 5/2001 | Wei et al. |
| 6,264,822 B1 | 7/2001 | Wei et al. |
| 6,290,461 B1 | 9/2001 | Wei et al. |
| 6,340,424 B1 | 1/2002 | Elman et al. |
| 6,453,211 B1 | 9/2002 | Randolph, Jr. et al. |
| 6,502,304 B2 | 1/2003 | Rigney et al. |
| 6,551,032 B1 | 4/2003 | Nolan et al. |
| 6,676,336 B2 | 1/2004 | Nolan et al. |
| 6,797,912 B2 | 9/2004 | Derehag et al. |
| 7,462,273 B2 | 12/2008 | Mielke |
| 7,741,576 B2 | 6/2010 | Trimmer et al. |
| 7,950,121 B2 | 5/2011 | Werner |
| 2006/0085979 A1 | 4/2006 | Bayer et al. |
| 2006/0156544 A1 * | 7/2006 | Sherlock et al. ............. 29/889.7 |
| 2008/0028607 A1 | 2/2008 | Lamphere et al. |
| 2009/0008265 A1 | 1/2009 | Bayer et al. |
| 2009/0020509 A1 * | 1/2009 | Trimmer et al. ........... 219/69.17 |
| 2009/0282678 A1 * | 11/2009 | Williams et al. ............. 29/889.1 |
| 2011/0150636 A1 | 6/2011 | Tholen et al. |
| 2011/0179646 A1 * | 7/2011 | Barnat ....................... 29/889.21 |
| 2011/0186442 A1 | 8/2011 | Bayer et al. |

\* cited by examiner

ELECTROCHEMICAL GRINDING TOOL AND METHOD

BACKGROUND OF THE INVENTION

The present invention generally relates to grinding tools and methods. More particularly, this invention relates to methods and systems for machining sharp edges of a slot that can be prone to cracking, for example, edge regions of slots within turbine wheels employed in turbomachines, including but not limited to gas turbines used in power generation.

In the hostile operating environments of gas turbine engines, the structural integrity of turbine rotor wheels, buckets, and other components within their turbine sections is of great importance in view of the high mechanical stresses that the components must be able to continuously withstand at high temperatures. For example, the regions of a turbine wheel forming slots into which the buckets are secured, typically in the form of what are known as dovetail slots, are known to eventually form cracks over time, necessitating monitoring of the wheel in these regions. In some wheel designs, nonlimiting examples of which include the stage 1, 2, and 3 wheels of the General Electric 9FB gas turbine, cooling of the buckets and wheel perimeter is assisted by the presence of a cooling slot located near the perimeter of the wheel and into which the dovetail slots extend. Over extended periods of time under the severe operating conditions of a wheel, cracks may form at common edges formed where the dovetail slots and cooling slot intersect. Optimization of the cooling slot geometry to reduce the likelihood of such cracks is desirable in order to improve expected life of a turbine wheel.

While a turbine rotor can be completely disassembled to gain access to its individual wheels, grinding techniques that can be performed with limited disassembly are preferred to minimize downtime, such as to fit within outage schedules of a gas turbine employed in the power generating industry. However, access to the cooling slot is very limited, and any grinding technique must address the difficulty of bringing the tool into stable proximity to the edges being rounded.

Currently, cooling slots of gas turbine engines are generally rounded by mechanical grinding followed by a finishing process, such as BPP (blend, polish, peen). These methods involve using a bit to remove material at the edge of the cooling slot and then blending and/or polishing the edges to obtain the desired radius of the intersection edges. However, a desired radius is often difficult to achieve if the grinding was preformed by mechanical means. Furthermore, BPP methods may fail to remove all of the cracks in the cooling slots.

Therefore, it would be desirable if a method existed by which sharp edges prone to cracks on a turbine wheel, particularly edge regions of slots within the wheel, could be rounded to a desired radius with minimal polishing and/or blending. It would also be desirable if such a process were able to be performed without necessitating complete disassembly of a turbine rotor to gain access to its individual wheels.

BRIEF DESCRIPTION OF THE INVENTION

The present invention provides electrochemical grinding tools and methods capable of rounding sharp edges that may be prone to cracking, for example, edge regions of cooling slots within a dovetail slot of a turbine wheel.

According to a first aspect of the invention, a method is provided for rounding an edge of a first slot that intersects at least a second slot of a component. The method entails the use of an electrochemical grinding tool comprising a drilling assembly, a conductive bit, means for rotating the conductive bit about an axis thereof, and means for applying an electrical potential to the conductive bit. The conductive bit of the electrochemical grinding tool is inserted into the second slot of the component, an electrolyte solution is applied between the conductive bit of the electrochemical grinding tool and the first slot, an electrical potential is applied to the conductive bit and the component to create a potential gradient between the conductive bit and the edge of the first slot, and material is removed from the edge of the first slot by displacing the conductive bit about and along the edge.

According to a second aspect of the invention, an electrochemical grinding tool is provided that is adapted to round an edge of a first slot within at least a second slot of a component. The electrochemical grinding tool includes a drilling assembly, a conductive bit rotatably mounted to the drilling assembly, means for rotating the conductive bit about an axis thereof, means for applying an electric potential to the conductive bit, and means for securing the electrochemical grinding tool to at least the second slot of component while performing an electrochemical grinding operation on the first slot of the component.

A technical effect of the invention is the ability to mount a grinding tool directly to a component, for example, a turbine wheel, for rounding edges of the component that may be prone to cracks. The use of the electrochemical grinding tool is particularly advantageous for rounding edge regions of cooling slots of turbine wheels to achieve a desired radius with minimal polishing and/or blending. Another advantage of the invention is the ability to employ the grinding tool without necessitating complete disassembly of a turbine rotor to gain access to its individual wheels.

Other aspects and advantages of this invention will be better appreciated from the following detailed description.

DETAILED DESCRIPTION OF THE INVENTION

The present invention will be described in terms of methods and an apparatus for machining an edge region of an article, for example, to repair and optimize the geometry of high stress edge regions of an article that are prone to cracking While various applications are foreseeable and possible, applications of particular interest include difficult to access regions of components of gas turbines, including land-based gas turbine engines. Of more particular interest are turbine wheels having axial dovetail slots along a perimeter thereof that are configured for mating with and securing airfoil members to the perimeter of the wheel, and an annular cooling slot that intersects the axial dovetail slots. A fragmentary view of such a turbine wheel 10 is represented in FIG. 1 and will serve as an example in the following discussion.

Figure 1:
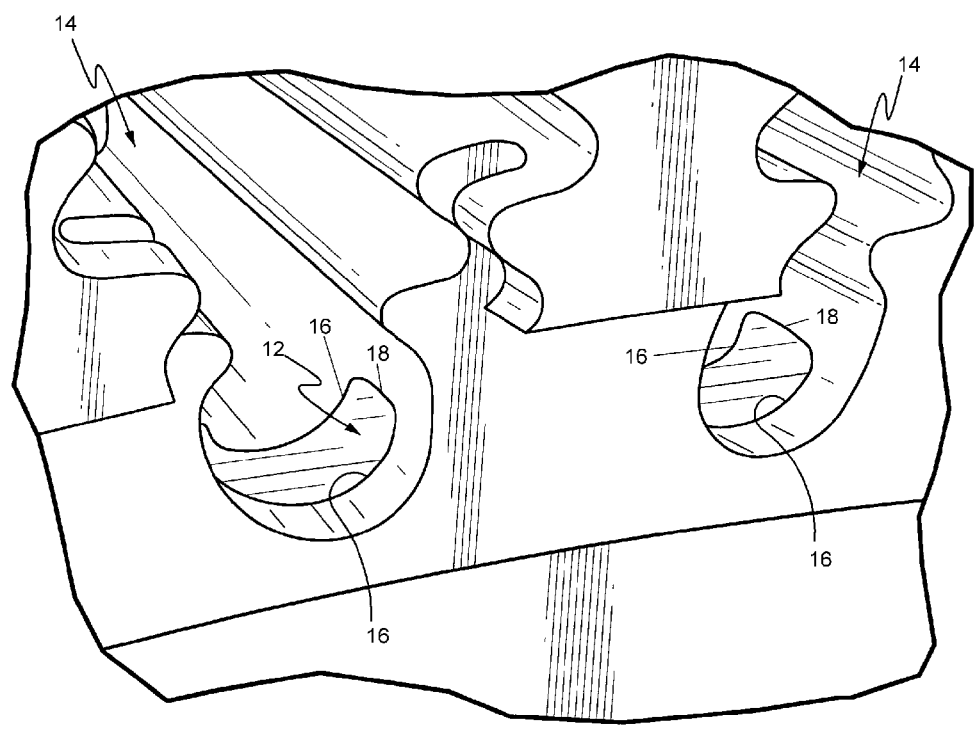
FIG. 1 represents a fragmentary perspective view showing a cooling slot and two dovetail slots of a turbine wheel.

FIG. 1 depicts two dovetail slots 14 of the turbine wheel 10, which is representative of the type conventionally used in gas turbine engines such as those used in the power generation industry. An annular cooling slot 12 intersects the axial dovetail slots 14. The cooling slot 12 comprises side edges 16 and radially-outward edges 18. If these edges 16 and 18 are sufficiently sharp, cracking can occur in regions of the cooling slot 12. As an example, cracking has been observed to occur near the intersection of the aft side edge 16 and the radially-outward edge 18 looking downstream of a gas turbine engine. Removing the turbine wheel 10 from the machine for the purpose of repairing or optimizing the geometries of these edges 16 and 18 is a long-lead, high-cost operation. The method and apparatus herein described provides a means of repairing and optimizing the geometry of the turbine wheel 10 in-situ in the case-off condition to reduce stress concentrations, for example, attributable to the geometries of the cooling slot edges 16 and 18. According to a preferred aspect of the invention, the method and apparatus entail an electrochemical chemical grinding (ECG) process that is capable of repairing the edges 16 and 18 by removing any damaged material and simultaneously rounding mating surfaces that form the edges 16 and 18. Peening may be used in a follow-on operation to apply a surface compression layer.

ECG is a low-force machining operation where electrochemical oxidation and light abrasive machining dominate the material removal process. Machined feature edges are naturally broken or created with radii. ECG processes can use specific tool electrodes to machine and generate surface features. Tool electrode materials are often copper, aluminum oxide, and a resin bonding material that cements the copper and ceramic together. ECG processes also use a conductive abrasive tool to machine features in parts. A power supply is connected to the conductive abrasive tool and a part to be machined to drive a potential gradient between the tool and part. This potential gradient is used to adjust the material removal rate and balance between anodic dissolution and abrasive grinding. The energy field intensity generated by the potential gradient can be adjusted by changing the applied potential and the tool position to consistently round the edges of a machined region. An electrolyte is typically flushed between the tool and part to remove machining swarf, chips, and dissolved metal ions. The removal of material and rounding of edges can be achieved in a single machining operation. Corners and edges typically have high field gradients, with the result that material removal rates at edges are normally greater than at flat surface regions, such that round corners are a natural artifact of ECG.

Figure 2:
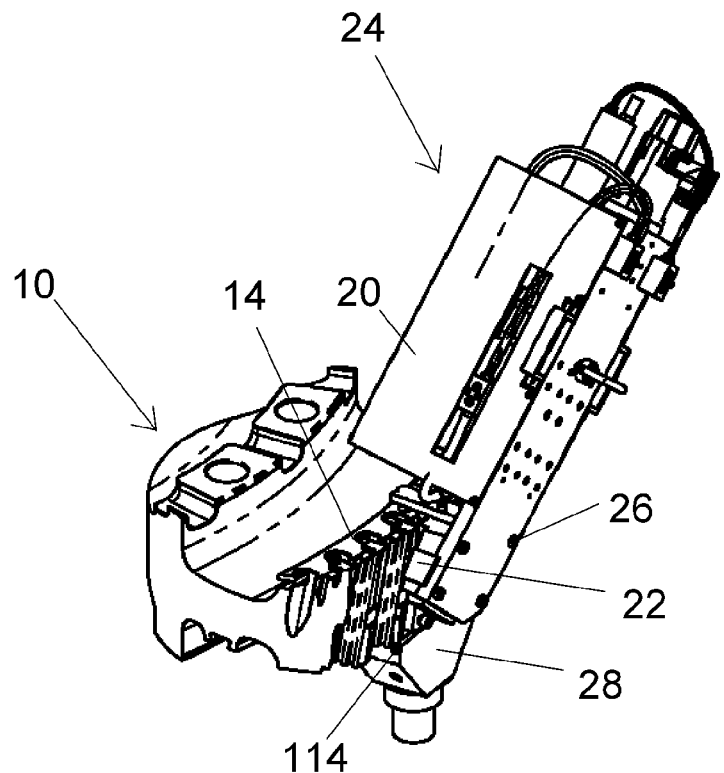
FIG. 2 represents a fragmentary perspective view of a turbine wheel and an electrochemical grinding tool engaged therewith in accordance with an embodiment of the invention.
Figure 3:
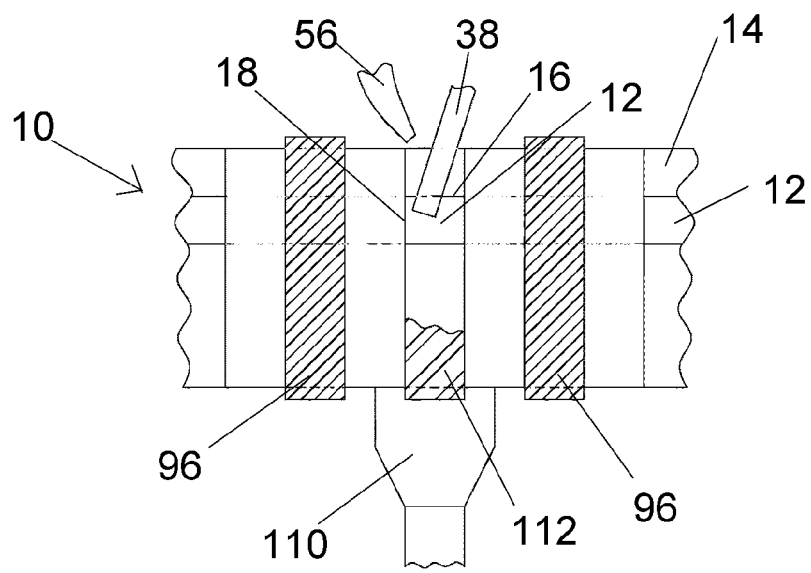
FIG. 3 represents a cross-sectional view showing the outer axial edge of the turbine wheel of FIG. 2 and the electrochemical grinding tool engaged therewith.
Figure 4:
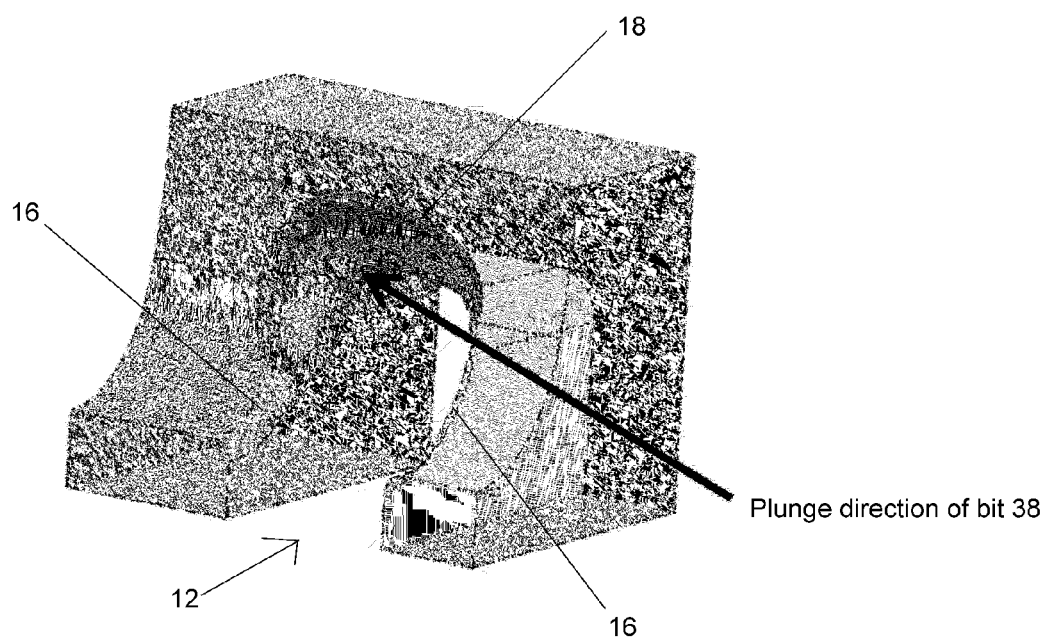
FIG. 4 represents a cross-sectional view showing the cooling slot of FIG. 3 after completion of the rounding process.

FIG. 2 depicts an ECG tool 24 secured to the turbine wheel 10 of FIG. 1 in accordance with an embodiment of the present invention. According to a preferred aspect of the invention, the ECG tool 24 includes a support assembly 22 adapted to mount the tool 24 to at least one dovetail slot 14 of the turbine wheel 10. The support assembly 22 (shown in more detail in FIG. 13) is mounted to the ECG tool 24, for example, with bolts or some other suitable means. In FIG. 3, dovetail locators 96 of the support assembly 22 are shown as being individually engaged with two dovetail slots 14 located on either side of an intermediate slot 14. As also represented in FIG. 3, the ECG tool 24 is adapted to lower a conductive bit 38 into a position near the edges 16 and 18 of a cooling slot 12 within the intermediate slot 14 of the wheel 10. Once the conductive bit 38 is in position, a potential gradient is preferably applied between the conductive bit 38 and a surface to be machined with the tool 24. The conductive bit 38 is rotated about its axis to remove material and round the edges 16 and 18 of the cooling slot 12 within the intermediate slot 14. FIG. 4 represents edges 16 and 18 of cooling slot 12 that have been rounded in accordance with a preferred aspect of this embodiment. As represented in FIG. 4, a corner formed by the edges 16 and 18 has been removed and replaced with a depression recessed in the component and the depression is surrounded with rounded edges.

Figure 5:
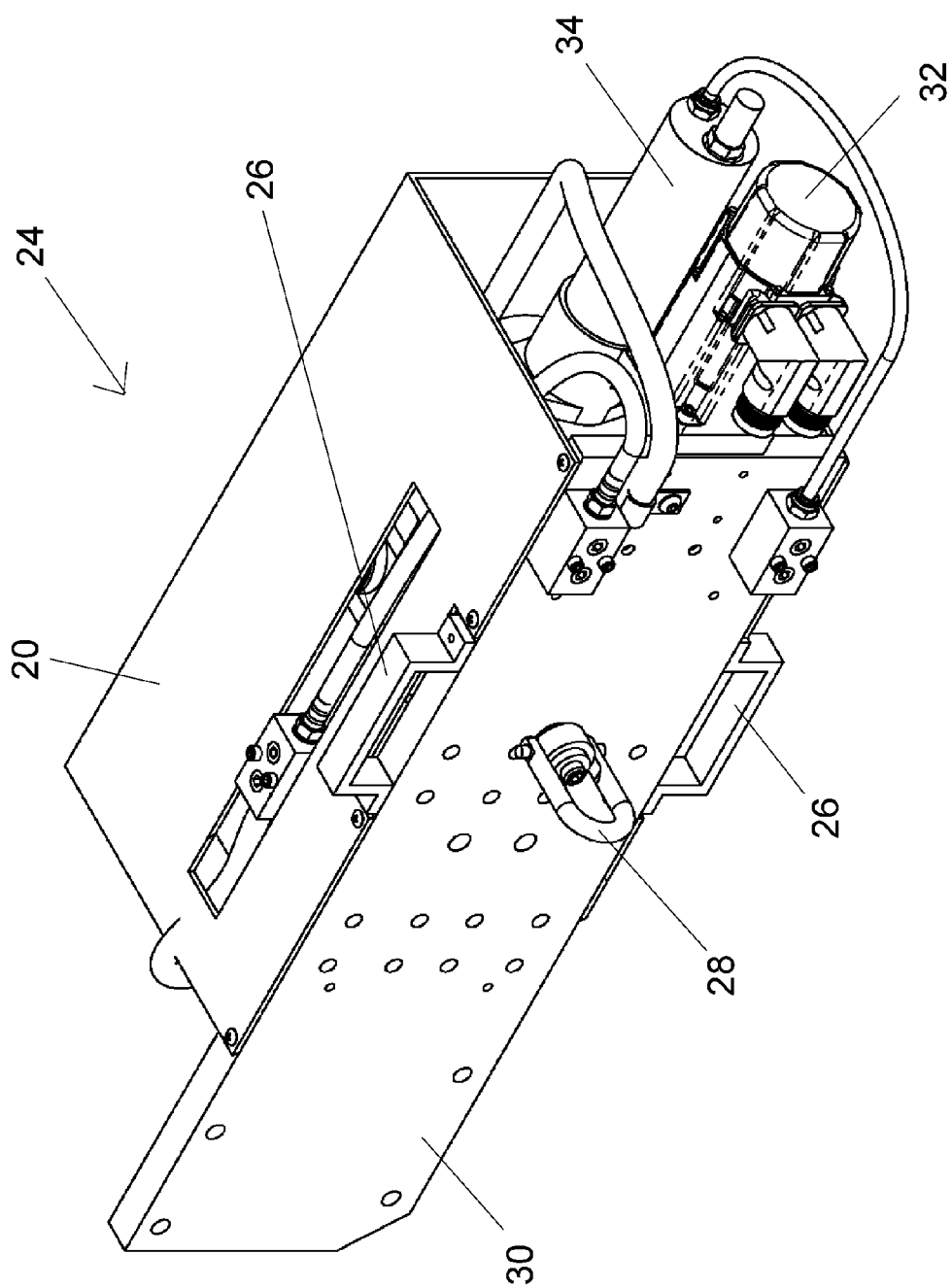
FIG. 5 represents a perspective view showing the electrochemical grinding tool of FIG. 2 disassembled from a support assembly and a suction assembly.

FIG. 5 represents the ECG tool 24 with the support assembly 22 removed therefrom. Handles 27 are located on sides of a support plate 30 and a hoist ring 28 is located on the outermost surface of the support plate 30. A protective cover 20 surrounds components of the ECG tool 24, including a drilling assembly 36 (FIGS. 6 and 10), a servomotor 32, and a motor 34. The support assembly 22, servomotor 32, motor 34, and drilling assembly 36 are all mounted to the support plate 30 so that the tool 24 can be installed and removed from the turbine wheel 10 as a unitary assembly.

Figure 6:
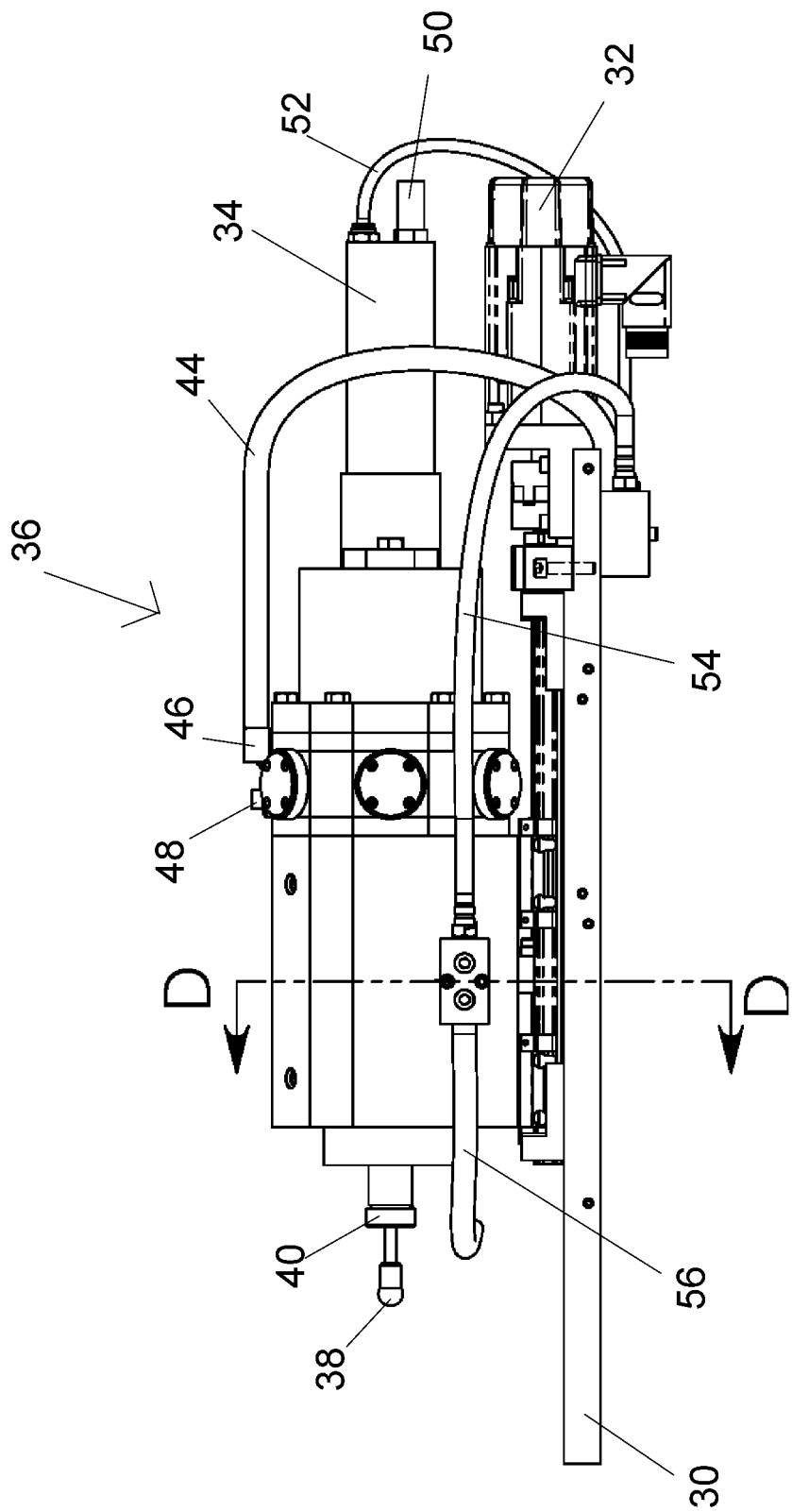
FIG. 6 represents a side view showing the electrochemical grinding tool of FIG. 5 with a protective cover removed.

FIG. 6 represents the ECG tool 24 with the protective cover 20 removed to expose the drill assembly 36 mounted on the support plate 30. The conductive bit 38 is mounted to the drill assembly 36 with a conductive spindle 40 that protrudes from the drill assembly 36. While not limited to any particular type of bit, the conductive bit 38 may be, for example, a 0.5 inch (1.3 cm) bit of a type commercially available. As represented in FIG. 3, the bit 38 is preferably held at a predetermined angle to edges 16 and 18 that corresponds to the design criteria for producing the desired material removal to reduce high stress areas of the cooling slot 12. As represented in FIG. 4, the predetermined angle is not parallel to, perpendicular to, or in-plane with any intersecting surfaces of the cooling slot 12 and the dovetail slot 14 or perpendicular to the edges 16 and 18. Similarly, according to the embodiments represented in FIGS. 1 and 4, the predetermined angle is not parallel to radials or an axis of rotation of the turbine wheel 10. As a nonlimiting example, the intersecting planes of the dovetail slot 14 are preferably desired to have a radius of about 0.030 to about 0.090 mils (about 0.76 to about 2.3 micrometers) or larger as long as the radius does not create any visible edges along the cooling slot 12. The conductive bit 38 plunge speed can be determined by the amount of pressure applied to the ECG tool 24 by the operator, a servo, pneumatic piston system, hydraulic system, or any other suitable means or method capable of delivering pressure to the tool 24. Acceptable feed rates are believed to be about 0.01 to about 1 inch (about 0.25 to 25 mm) per minute. A nonlimiting example of an acceptable plunge distance for achieving a desirable geometry in the cooling slot 12 is approximately 0.125 inches (about 0.3 centimeter).

Figure 7:
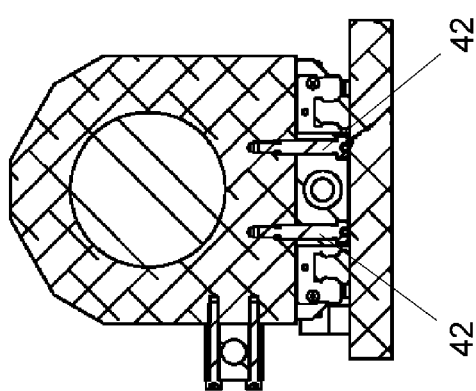
FIG. 7 represents a cross-sectional view taken along section line 6-6 of FIG. 6.
Figure 8:
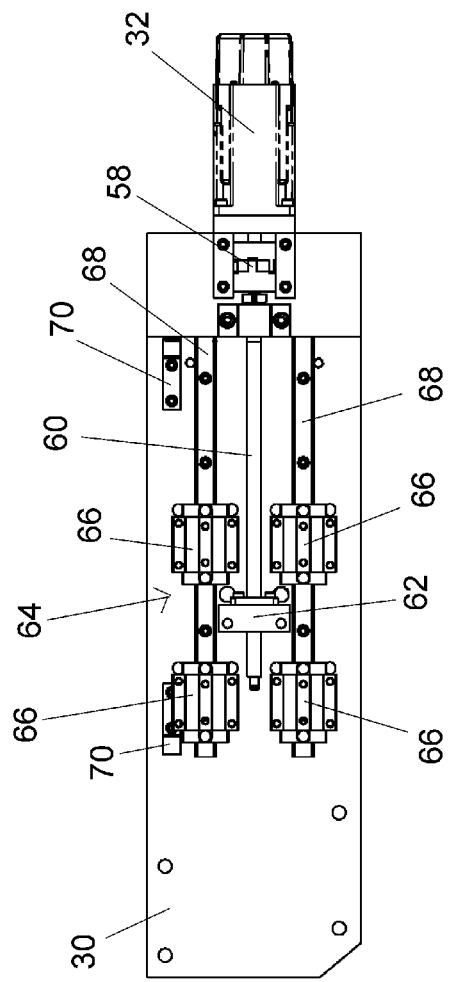
FIG. 8 represents a top view of a support plate of the electrochemical grinding tool of FIG. 6.

In the embodiments represented in the figures, the plunge speed and position of the conductive bit 38 are controlled by a servomotor 32. In particular, the servomotor 32 is coupled with a ball screw 60 to a ball nut housing 62 to which the drill assembly 36 is mounted. The servomotor 32 can be paired with an encoder (not shown) to provide position and speed feedback to determine the plunge speed, thereby eliminating the need for operator intervention during the machining operation. The servomotor 32 can be mounted to the support plate 30 in a manner as represented in FIGS. 6 and 7. As more readily evident from FIG. 8, a coupling 58 connects the ball screw 60 and ball nut housing 62 to the servomotor 32. As the servomotor 32 displaces the drill assembly 36, the drill assembly 36 is translated on linear slide assemblies 64. The drill assembly 36 is mounted to carriages 66 of the slide assemblies 64 by screws 42, as represented in FIG. 7. Referring again to FIG. 8, the carriages 66 slide on rails 68 along a longitudinal axis of the ECG tool 24. Travel stops 70 are located near the ends of the rails 68 to retain the carriages 66 on the rails 68 and to limit the distance the carriages 66 may travel along the rails 68.

Figure 9:
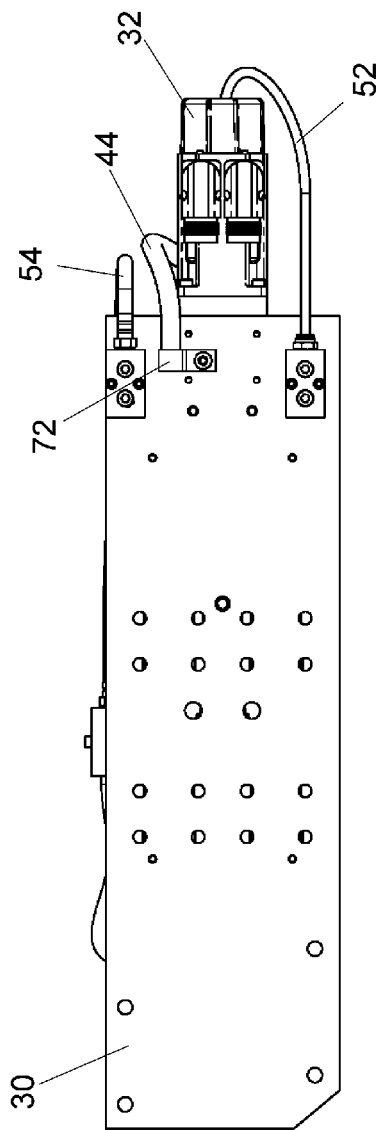
FIG. 9 represents a bottom view of the electrochemical grinding tool of FIG. 6.
Figure 10:
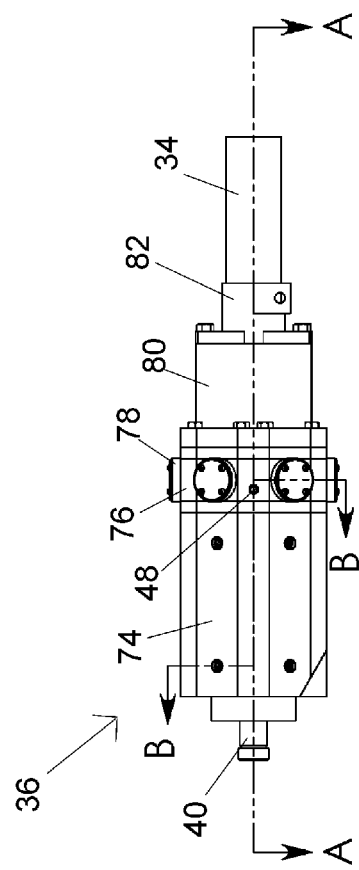
FIG. 10 represents a plan view of a drilling assembly of the electrochemical grinding tool of FIG. 6.
Figure 11:
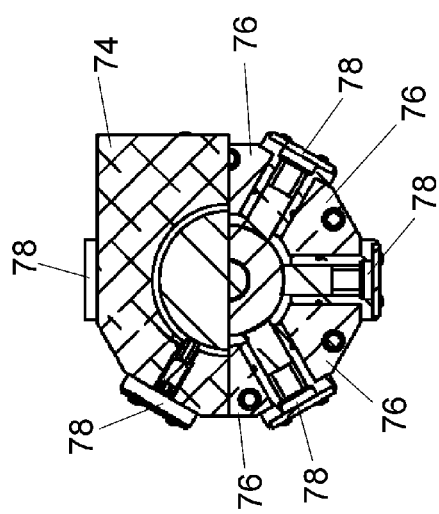
FIGS. 11 and 12 represent cross-sectional views of the drilling assembly of FIG. 10 taken along section lines 10-10 and 11-11, respectively.

FIG. 10 represents the drilling assembly 36 disassembled from the support plate 30. The drilling assembly 36 is represented as comprising brush housings 76, a motor flange 80, and a spindle housing 74. As represented in FIG. 11, the brush housings 76 secure brush assemblies 78 and collectors 48 that serve to complete an electrical circuit between a fixed conductor (not shown) and the rotating spindle 40 and bit 38. A wire 44, shown in FIG. 9, may be connected to an external power source (not shown) which supplies electricity to the brush assemblies 78. As represented in FIGS. 6 and 9, a lug ring 46 connects the wire 44 to the brush assemblies 78 and a clamp 72 connects the wire 44 to the outermost surface of the support plate 30. The external power source, brush assemblies 78 and collectors 48 provide the means by which the potential gradient may be applied between the cooling slot 12 and the spindle 40. Suitable potential gradients are believed to be over a range of about 2 to about 20 volts, though the use of lower and higher potential gradients is also foreseeable.

Figure 12:
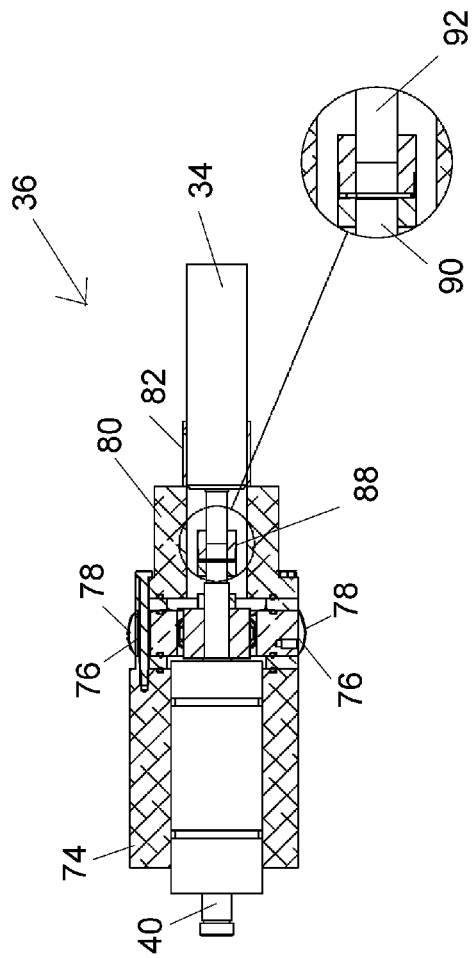

The drilling assembly 36 is represented in FIG. 10 as further comprising a motor mounting flange, 82 that secures the motor 34 to the motor flange 80. The motor 34 provides the means by which the conductive bit 38 is rotated on its axis. Suitable rotational speeds for the conductive bit 38 are believed to be about 500 to about 40,000 RPM, preferably about 20,000 RPM, though higher and lower speeds are foreseeable. The motor 34 is preferably an air motor, though it is foreseeable that the motor 34 could be an electric motor, a belt-drive motor, or another type of motor capable of providing acceptable operational speeds. FIG. 12 represents a coupling 88 connecting an axle 92 of the motor 34 to a spindle axle 90 coupled to the spindle 40. The motor 34 rotates the axle 92, spindle axle 90, and spindle 40 thereby rotating the conductive bit 38. The motor 34 can be connected to a suitable compressed air supply (not shown) with a tube 52. An exhaust muffler 50 is located on the motor 34 for muffling the sound produced by the motor 34 during its operation.

The ECG tool 24 is also preferably equipped to flush or mist an electrolyte solution (not shown) onto surfaces of the cooling slot 12 adjacent the edges 16 and 18 and the conductive bit 38. The electrolyte is preferably forced to flow in a manner that does not allow other gas turbine components to be wetted. Preferred electrolytes comprise aqueous salts, for example, sodium formate, that do not promote pitting or corrosion of other components of the gas turbine should some electrolyte leak from the flow region. As more readily seen in FIG. 6, a hose 54 is provided through which an electrolyte solution from a suitable supply (not shown) can be pumped to a modular hose system 56 that directs the solution at the surfaces intended to be flushed or misted (FIG. 3).

Figure 13:
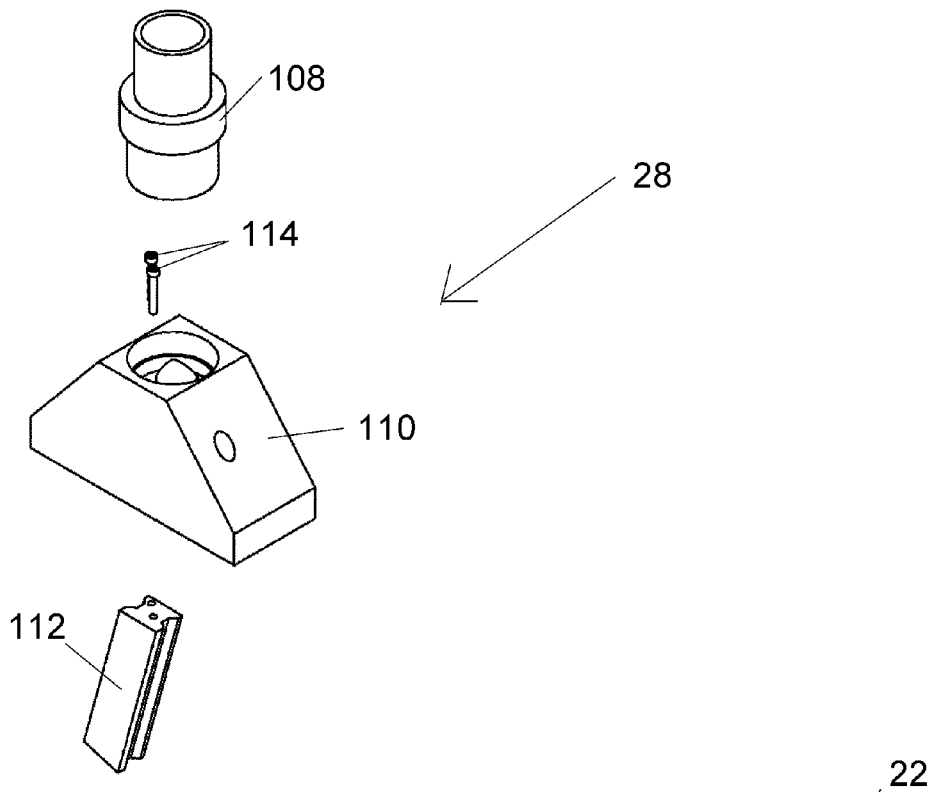
FIG. 13 represents an exploded perspective view of a suction assembly of the electrochemical grinding tool of FIG. 2.

In a preferred aspect of the invention, FIGS. 2 and 3 represent a suction assembly 26 mounted to the support plate 30 of the ECG tool 24. The suction assembly 26 collects the electrolyte solution supplied by the hose system 56 during the ECG process. The collected electrolyte solution may be re-used or discarded. The solution and suction assembly 26 serve to eliminate damaged material removed by the conductive bit 38 from the cooling slot 12 as well as eliminate material removed as a result of rounding the edges 16 and 18 of the slot 12. The suction assembly 26 provides suction to collect the electrolyte. In the embodiment shown, the electrolyte is collected with the suction assembly 26 at the aft end of the dovetail slot 14 being machined, though it is foreseeable that the electrolyte could be collected from other locations, for example, the dovetail slots 14 adjacent to the dovetail slot 14 being machined by pulling the electrolyte through the cooling slot 12. An exploded view of a particular example of the suction assembly 26 is represented in FIG. 13. The suction assembly 26 is represented as comprising a manifold 110 that may be connected to a suction source (not shown) by a hose fitting 108. A seal insert and/or vacuum insert 112 that is shaped to closely fit within the dovetail slot 14 is used to seal the dovetail slot 14 to be machined during operation to further reduce the likelihood that electrolyte solution will contact surfaces of the turbine wheel 10 other than those to be machined, as should be evident from FIG. 3.

Figure 14:
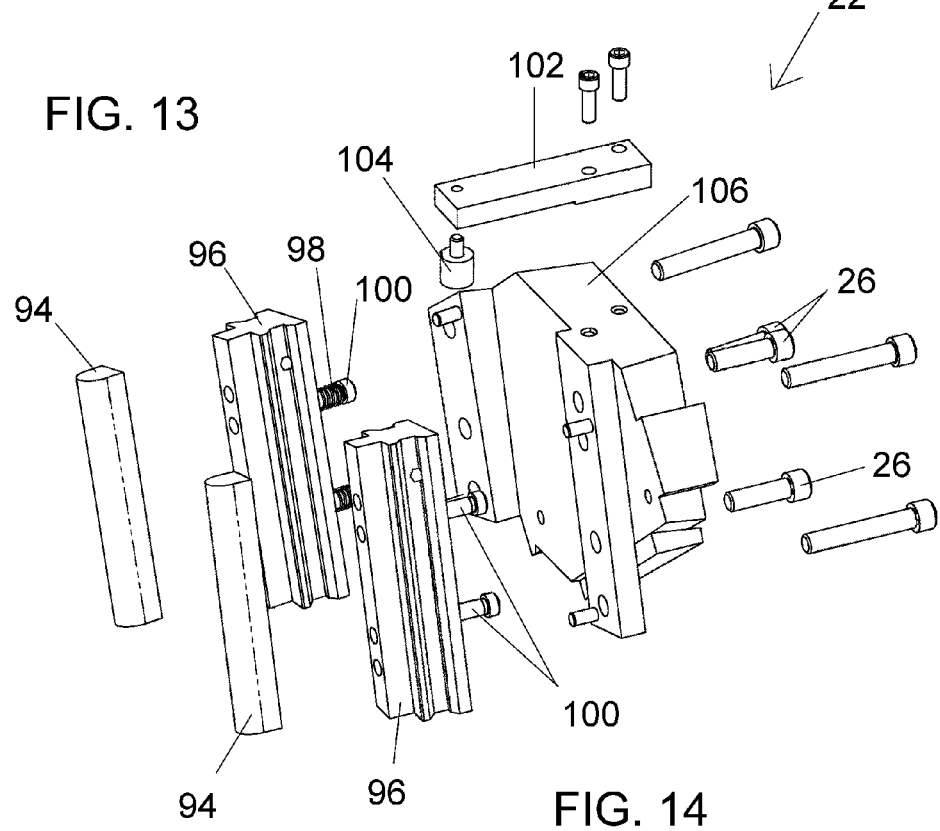
FIG. 14 represents an exploded perspective view of a support assembly of the electrochemical grinding tool of FIG. 2.

As previously noted with reference to FIGS. 2 and 3, the support assembly 22 secures the support plate 30 to the turbine wheel 10 to position and stabilize the ECG tool 24. As previously stated, although various means of supporting the ECG tool 24 are foreseeable, a preferred example of the support assembly 22 is attached to the turbine wheel 10 by interacting with the dovetail slots 14 on either side of the slot 14 being machined. FIG. 14 represents a preferred embodiment of the support assembly 22 as comprising the two dovetail locators 96 that are shaped to engage the dovetail slots 14 of the turbine wheel 10. As evident from FIG. 3, the dovetail locators 96 are preferably spaced to allow the support assembly 22 to be secured to dovetail slots 14 on opposite sides of the dovetail slot 14 intended to be machined. In FIG. 14, the spacing between the locators 96 is maintained by a bracket 106 to which the locators 96 are mounted. The locators 96 are slidably mounted to the bracket 106 with pins 14, and bolts 100 equipped with springs 98 serve to bias the locators 96 away from the bracket 106 to provide for more secure engagement between the locators 96 and the slots 14 in which they are received mounted. Each locator 96 is equipped with a compliant foot 94 to reduce the risk of damage to the dovetail slots 14. A wheel locator 102 is attached to the bracket 106 and a stop 104 is connected to the wheel locator 102 to assist in positioning the support assembly 22 at a predetermined position on the turbine wheel 10. During mounting of the support assembly 22 to the turbine wheel 10, the dovetail locators 96 enter their respective slots 14 through an axial end thereof, and are then slid toward the opposite end the dovetail slots 14 until the stop 104 contacts a surface of the turbine wheel 10. The bolts 100 can be tightened to increase the clamping pressure between the locators 96 and the dovetail slots 14 to secure the support assembly 22.

Once the cooling slot 12 has been adequately machined, the cooling slot 12 and dovetail slots 14 may be flushed to remove and/or dilute residual electrolyte solution that may remain. Ultrasonic peening or another follow-on operation may then be used to apply a protective surface compression layer.

While the invention has been described in terms of certain embodiments, it is apparent that other forms could be adopted by one skilled in the art. Therefore, the scope of the invention is to be limited only by the following claims.

The invention claimed is:

1. A method of rounding an edge of a first slot within at least a second slot of a component at an interface between surfaces of the first slot and the at least second slot, the method comprising:
   providing a electrochemical grinding tool comprising a drilling assembly, a conductive bit, means for rotating the conductive bit about an axis thereof, and means for applying an electrical potential to the conductive bit;
   inserting the conductive bit of the electrochemical grinding tool into the second slot;
   applying an electrolyte solution between the first slot and the conductive bit of the electrochemical grinding tool;
   applying the electrical potential to the conductive bit and the component to create a potential gradient between the conductive bit and the edge of the first slot; and
   removing material from the edge of the first slot by displacing the conductive bit in a direction towards the edge and along an axis of rotation of the conductive bit to remove the edge by creating a depression in the component, the depression being recessed into the component and having rounded edges.

2. The method according to claim 1, further comprising securing the electrochemical grinding tool to the component.

3. The method according to claim 1, wherein the edge is a corner formed by intersecting edges at the interface between the first slot and the at least second slot.

4. The method according to claim 1, further comprising securing a suction assembly to the electrochemical grinding tool, and collecting the electrolyte solution with the suction assembly during the removing step.

5. The method according to claim 1, wherein the direction that the conductive bit is displaced is at a predetermined angle relative to the edge and is not parallel or perpendicular with any of the surfaces of the first and second slots that intersect to form the edge.

6. The method according to claim 1, wherein the rounded edges have a radius of 0.76 millimeters or larger.

7. The method according to claim 1, wherein the conductive bit is displaced about and along the edge by translating the drilling assembly within the electrochemical grinding tool.

8. The method according to claim 1, wherein the component is a turbine wheel, the first slot is a cooling slot of the turbine wheel, and the second slot is a dovetail slot of the turbine wheel.

9. The method according to claim 8, wherein the direction that the conductive bit is displaced is at a predetermined angle relative to the edge and is not parallel or perpendicular with radials of the turbine wheel or with an axis of rotation of the turbine wheel.

* * * * *